United States Patent
Cosgrave et al.

(10) Patent No.: US 10,309,803 B2
(45) Date of Patent: Jun. 4, 2019

(54) DETECTING SENSOR ERROR

(71) Applicants: Analog Devices Global, Hamilton (BM); Sensitec GmbH, Lahnau (DE)

(72) Inventors: Gavin Patrick Cosgrave, Enniscorthy (IE); Jochen Schmitt, Biedenkopf (DE); Dermot G. O'Keeffe, Blarney (IE)

(73) Assignees: Analog Devices Global, Hamilton (BM); Sensitec GmbH, Lahnau (DE)

( * ) Notice: Subject to any disclaimer, the term of this patent is extended or adjusted under 35 U.S.C. 154(b) by 178 days.

(21) Appl. No.: 15/048,883

(22) Filed: Feb. 19, 2016

(65) Prior Publication Data

US 2016/0245677 A1    Aug. 25, 2016

Related U.S. Application Data

(60) Provisional application No. 62/118,963, filed on Feb. 20, 2015.

(51) Int. Cl.
| | | |
|---|---|---|
| *G01D 5/16* | (2006.01) | |
| *G01D 5/244* | (2006.01) | |
| *G01D 5/14* | (2006.01) | |

(52) U.S. Cl.
CPC ......... *G01D 5/24461* (2013.01); *G01D 5/145* (2013.01)

(58) Field of Classification Search
CPC .. G01R 33/096; G01R 31/2829; G01R 35/00; G01D 5/24485
See application file for complete search history.

(56) References Cited

U.S. PATENT DOCUMENTS

| | | |
|---|---|---|
| 5,927,430 A | 7/1999 | Yoshinobu et al. |
| 6,191,579 B1 | 2/2001 | Striker |
| | (Continued) | |

FOREIGN PATENT DOCUMENTS

| | | |
|---|---|---|
| CN | 1754080 | 3/2006 |
| CN | 101419049 | 4/2009 |
| | (Continued) | |

OTHER PUBLICATIONS

German Office Action dated Nov. 16, 2016 for German Patent Application No. 10 2016 102 927.0.

(Continued)

*Primary Examiner* — Huy Q Phan
*Assistant Examiner* — Adam S Clarke
(74) *Attorney, Agent, or Firm* — Knobbe, Martens, Olson & Bear, LLP

(57) ABSTRACT

Sensor error detection with an additional channel is disclosed herein. First and second magnetic sensing elements can be disposed at angles relative to each other. In some embodiments, the first and second magnetic sensing elements can be magnetoresistive sensing elements, such as anisotropic magnetoresistance (AMR) sensing elements. Sensor data from first and second channels, respectively, having the first and second sensing elements, can be obtained. Third channel can receive a signal from the first sensing element and a signal from the second sensing element, and sensor data from the third channel can be obtained. Expected third channel data can be determined and compared to the obtained third channel data to indicate error.

20 Claims, 10 Drawing Sheets

(56) References Cited

U.S. PATENT DOCUMENTS

| | | | |
|---|---|---|---|
| 6,304,074 B1 | 10/2001 | Waffenschmidt | |
| 6,633,462 B2 | 10/2003 | Adelerhof | |
| 7,227,353 B2 | 6/2007 | Shigetoshi et al. | |
| 7,408,343 B2 | 8/2008 | Dmytriw et al. | |
| 7,694,777 B2 | 4/2010 | Masaharu et al. | |
| 7,847,542 B2 | 12/2010 | Bartos et al. | |
| 7,956,610 B2 | 6/2011 | Granig et al. | |
| 7,965,074 B2 | 6/2011 | Nakagawa et al. | |
| 8,232,795 B2 | 7/2012 | Saruki et al. | |
| 8,258,782 B2 | 9/2012 | Kaita et al. | |
| 8,729,892 B2 | 5/2014 | Friedrich | |
| 8,884,616 B2 | 11/2014 | Zimmer et al. | |
| 9,097,509 B2 | 8/2015 | Abe et al. | |
| 2003/0052669 A1 | 3/2003 | Enomoto et al. | |
| 2006/0290312 A1* | 12/2006 | Nagai | H02P 6/182 318/599 |
| 2008/0234891 A1 | 9/2008 | Pyo | |
| 2008/0278158 A1 | 11/2008 | Granig et al. | |
| 2009/0206827 A1 | 8/2009 | Aimuta et al. | |
| 2010/0171488 A1 | 7/2010 | Wipenmyr et al. | |
| 2011/0087456 A1* | 4/2011 | Satou | B62D 5/049 702/151 |
| 2011/0290205 A1* | 12/2011 | Kozawa | F01L 1/352 123/90.17 |
| 2012/0025808 A1 | 2/2012 | Granig et al. | |
| 2013/0289936 A1 | 10/2013 | Houda | |
| 2014/0028294 A1 | 1/2014 | Granig et al. | |
| 2014/0191625 A1* | 7/2014 | Kitamoto | G01D 3/08 310/68 B |
| 2014/0197818 A1 | 7/2014 | Stanley | |
| 2014/0292313 A1 | 10/2014 | Ueda et al. | |
| 2015/0108971 A1 | 4/2015 | Granig et al. | |
| 2015/0176963 A1* | 6/2015 | Diaconu | G01R 33/077 702/95 |
| 2015/0176964 A1* | 6/2015 | Uberti | G01R 33/0029 702/95 |
| 2015/0241523 A1 | 8/2015 | Scherr | |
| 2015/0377646 A1* | 12/2015 | Meyer | G01D 5/14 324/207.25 |
| 2016/0123780 A1 | 5/2016 | Snyder et al. | |
| 2016/0245893 A1 | 8/2016 | Cosgrave et al. | |
| 2016/0291114 A1* | 10/2016 | Bacquet | G01R 31/3658 |

FOREIGN PATENT DOCUMENTS

| | | |
|---|---|---|
| CN | 101603808 | 12/2009 |
| CN | 101995558 | 3/2011 |
| DE | 000004412982 | 9/1995 |
| DE | 198 34 454 | 2/1999 |
| DE | 101 01 174 | 7/2002 |
| DE | 102 11 017 | 10/2003 |
| DE | 10 2004 041 559 | 3/2005 |
| DE | 10 2007 037 639 | 3/2008 |
| EP | 2 960 666 A1 | 12/2015 |
| JP | 10-132506 | 5/1998 |
| JP | 2006-105932 A | 4/2006 |
| WO | WO 2005/101043 A1 | 10/2005 |

OTHER PUBLICATIONS

Analog Devices, Integrated AMR Angle Sensor and Signal Conditioner, Analog Devices—ADA4571 Data Sheet, Rev. 0, Oct. 2014, 21 pages.
Analog Devices, Magnetoresistive Angle Measurement, Analog Devices—Circuit Note CN-0323, Rev. 0, Oct. 2013, 6 pages.
Dilger, "On a redundant diversified steering angle sensor", *On-Line Testing Symposium. IOLTS. 9th IEEE*, (Jul. 2003), pp. 191-196.
Giebeler, Robust GMR sensors for angle detection and rotation speed sensing, Elsevier, Sensors and Actuators A 91 (2001) 16-20.
Guyol, AMR Angle Sensors, Analog Devices—AN-1314 Application Note, Rev. 0, Oct. 2014, 10 pages.
Ripka, "Crossfield Sensitivity in AMR Sensors", *Magnetics IEEE Transactions on*, vol. 45, pp. 4514-4517, 2009, ISSN 0018-9464.
Treutler, Magnetic sensors for automotive applications, Elsevier, Sensors and Actuators A 91 (2001) 2-6.
Combined Search Report and Examination Report in United Kingdom Patent Application No. GB1602899.5, dated Sep. 9, 2016, 9 pages.
Chinese Office Action dated Sep. 28, 2017 for Chinese Patent Application No. 2016-10091583.2, 6 pages.

\* cited by examiner

DETECTING SENSOR ERROR

CROSS-REFERENCE TO RELATED APPLICATION

This application claims the benefit under 35 U.S.C. § 119(e) of U.S. Provisional Application No. 62/118,963, filed Feb. 20, 2015, and titled "DETECTING SENSOR ERROR," the entirety of which is hereby incorporated by reference.

BACKGROUND

Technical Field

The described technology generated relates to sensors and, more specifically, to apparatus and methods for detecting sensor errors through various combinations of sensing elements.

Description of the Related Art

Magnetic sensors can be implemented to obtain linear or circular position or angle information of a mechanical component, such as a shaft, in various applications, including an automotive steering system. Magnetic sensing elements used in magnetic angle sensors often suffer from changing sensitivity levels and non-linearity errors due to, for example, temperature change, and it is desirable to implement a sensor error detection mechanism for magnetic sensors.

SUMMARY OF CERTAIN INVENTIVE ASPECTS

The methods and devices of the described technology each have several aspects, no single one of which is solely responsible for its desirable attributes.

One embodiment is an apparatus for detecting sensor error, the apparatus including a first channel including a first magnetic sensing element, the first channel configured to provide first channel data, a second channel including a second magnetic sensing element, the second channel configured to provide second channel data, a third channel configured to receive a first signal from the first sensing element and a second signal from the second sensing element, the third channel configured to provide third channel data, and a processor. The processor is configured to receive first channel data from the first channel, second channel data from the second channel, and third channel data, compute expected third channel data from the first channel data and the second channel data, and detect sensor error based at least partly on a comparison of the expected third sensor data with the third channel data.

Each of the first and second sensing elements can be a magnetoresistive sensor. For instance, the first and second sensing elements can be anisotropic magnetoresistance (AMR) sensors, giant magnetoresistive (GMR) sensors, or tunneling magnetoresistive (TMR) sensors. The processor can be further configured to determine an angle and a radius based at least partly on the first sensor data and the second sensor data, compute expected third sensor data based at least partly on the angle and the radius, and detect the sensor error by comparing the expected third sensor data with the third sensor data. The first sensing element can include a first full bridge and the second sensing element can include a second full bridge, and the first signal is an output from the first full bridge and the second signal is an output from the second full bridge. The third signal is an output from a half-bridge of the first full bridge and a half-bridge of the second full bridge. The first sensing channel can be configured to process two half bridge outputs of the first full bridge and the second sensing channel is configured to process two half bridge outputs of the second full bridge.

Each of the first, second, and third sensing channels can further include an amplifier and a sampling circuit. The first and second sensing channels can be embodied in a single die. The first and second sensing elements can be collocated. Each of the first and second elements can be configured to provide a differential output. The apparatus can be configured to provide an error flag responsive to the detected error satisfying a threshold. Another embodiment can be an electronic power assisted steering system including the above-mentioned apparatus for detecting sensor error.

Another embodiment is a method for detecting sensor error, the method including receiving first sensor data from a first channel and second sensor data from a second channel, determining an angle and a radius based at least partly on the first sensor data and the second sensor data, computing the expected third sensor data based at least partly on the angle and the radius, and detecting sensor error based at least partly on a comparison of the expected third sensor data with the third sensor data. The first channel includes a first magnetic sensing element. The second channel includes a second magnetic sensing element, the second magnetic sensing element oriented at a first angle relative to the first sensing element. The third channel is configured to receive a first signal from the first magnetic sensing element and a second signal from the second magnetic sensing element.

The method for detecting sensor error can further include determining the angle, which can include computing the angle using an arctan function. The method can further include providing an error flag responsive to the detected error satisfying a threshold. Each of the first and second sensing elements can be an anisotropic magnetoresistance (AMR) sensor. The first angle can be approximately 45 degrees.

Another embodiment is an apparatus for detecting sensor error, the apparatus including a first magnetic sensing element comprising a first full bridge having two half bridge outputs, a second magnetic sensing element comprising a second full bridge having two half bridge outputs, three differential amplifiers, and a processor in communication with the three differential amplifiers. Each of the three differential amplifiers are configured to receive two signals from the half bridges of the first magnetic sensing element and the second magnetic sensing element, and wherein each of the differential amplifiers are configured to receive different combinations of the half bridge signals. The processor is configured to receive data associated with outputs of two of the three differential amplifiers, compute expected data associated with an output of the third of the three differential amplifiers based on the received data, detect sensor error based at least partly on a comparison of the expected data associated with the output of the third differential amplifier and data associated with an output of the third differential amplifier. The first magnetic sensing element and the second magnetic sensing element can be oriented at approximately 45 degrees to each other when they are AMR sensors. The first magnetic sensing element and the second magnetic sensing element can be oriented at approximately 90 degrees to each other when they are GMR sensors or TMR sensors.

Another embodiment is an apparatus for detecting sensor error, the apparatus includes a first channel comprising a first magnetic sensing element comprising a first full bridge having two half bridge outputs, a second channel comprising a second magnetic sensing element comprising a second full bridge having two half bridge outputs, a third channel configured to receive a first signal from one of the half bridge outputs of the first full bridge and a second signal from one of the half bridge outputs of the second full bridge, and a processor. The processor is configured to receive first channel data from the first channel, second channel data from the second channel, and third channel data from the third channel. The processor is further configured to compute a first value from two of the first channel data, second channel data, and third channel data and compute a second value from another two of the first channel data, second channel data, and third channel data, and detect sensor error based at least partly on a comparison of the first value with the second value.

BRIEF DESCRIPTION OF THE DRAWINGS

These drawings and the associated description herein are provided to illustrate specific embodiments of the invention and are not intended to be limiting.

DETAILED DESCRIPTION OF CERTAIN EMBODIMENTS

Figure 1A:
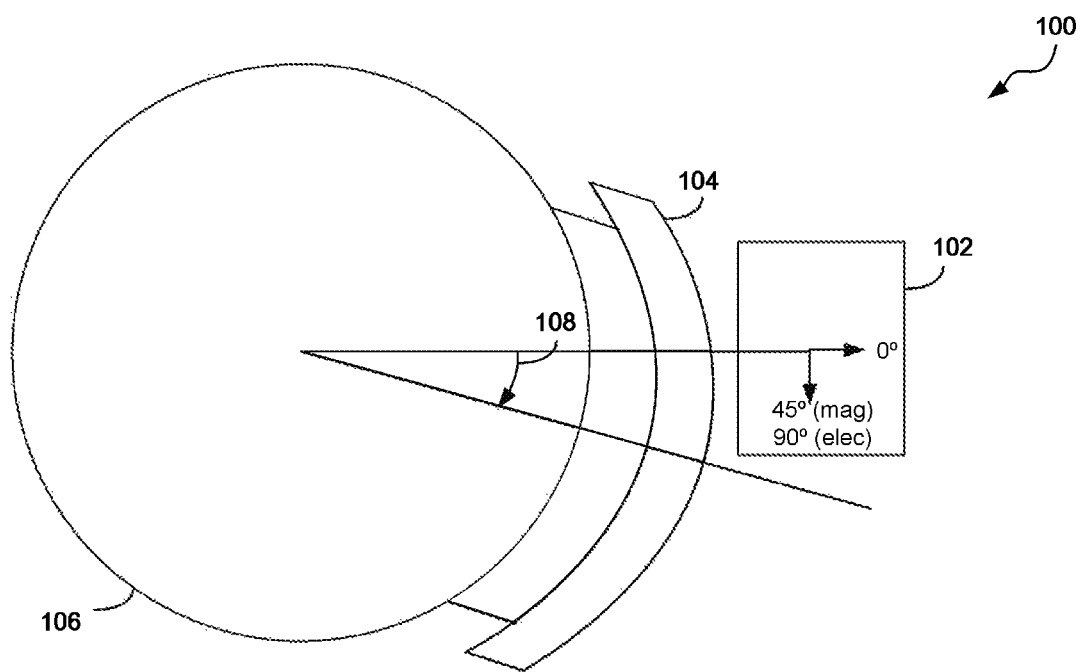
FIG. 1A is a diagram of an example implementation of the technology disclosed herein according to one embodiment.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

In some embodiments, the disclosure herein may be applied to an apparatus having a rotating shaft, which may include one or more magnetic elements such as dipole or ring magnets. A measurement of the magnetic field by the sensing elements can be used to determine the angle of rotation of the shaft and a radius representative of synchronous multichannel sensor outputs, for example. In some embodiments, the magnetic angle of rotation $ANGLE_{MAG}$ can be calculated as:

$$ANGLE_{MAG} = \frac{\arctan\left(\frac{V_{SIN}}{V_{COS}}\right)}{2} \quad \text{(Equation 1)}$$

and the sensor output radius $V_{RAD}$ can be determined as:

$$V_{RAD} = \sqrt{\left(V_{SIN} - \frac{V_{REF}}{2}\right)^2 + \left(V_{COS} - \frac{V_{REF}}{2}\right)^2} \quad \text{(Equation 2)}$$

where $V_{SIN}$ and $V_{COS}$ are respective output voltages of two channels having respective sensing elements, for example, with their sensing elements oriented at a physical angle of about 45° with each other, the sensor output radius $V_{RAD}$ is a voltage representative of synchronized outputs of the two channels having respective sensing elements, and where $V_{REF}$ is the reference voltage applied to the sensing elements. Each of the bridge outputs can have a sinusoidal response to magnetic angle, and in embodiments having the first and second sensing elements oriented at about 45° relative to each other, the two bridge outputs can be represented by the following equations:

$$V_{SIN} = V_{RAD} \times \sin(2 \times ANGLE_{MAG} \times \pi/180) \quad \text{(Equation 3)}$$

$$V_{COS} = V_{RAD} \times \sin(2 \times (ANGLE_{MAG} + 45°) \times \pi/180) \quad \text{(Equation 4)}$$

where $V_{SIN}$ and $V_{COS}$ are full bridge outputs of the two channels.

The sensor output radius $V_{RAD}$ can be substantially constant at a given temperature when the two channel data ($V_{SIN}$ and $V_{COS}$) are synchronized, and a significant deviation from the calculated radius voltage at a given temperature may indicate an error or a defect in the system. In other embodiments, the error detection disclosed herein can be applied to an apparatus measuring parameters other than a rotation angle, such as length or current.

FIG. 1A shows a diagram of an example implementation of the technology disclosed herein according to one embodiment. The illustrated implementation 100 includes a shaft 106, a magnet 104, and a sensing circuit 102. A rotation angle 108 is also illustrated in FIG. 1A. Embodiments of the sensing circuit 102 are further described in connection with FIGS. 1B to 2B below. The magnet 104 can be attached to the rotating shaft 106. The rotating shaft 106 can be associated with a steering wheel of a motor vehicle in certain implementations. The sensing circuit 102 can sense changes in position of the magnet 104 and provide an indication of rotation of the rotating shaft 106.

In embodiments including magnetic elements on a rotating shaft (e.g., the shaft 106), magnetic sensors such as anisotropic magnetoresistive (AMR) sensors, giant magnetoresistive (GMR), or tunneling magnetoresistive (TMR) sensors, or any other suitable magnetoresistive (XMR) sensors can be used as sensing elements to implement the disclosed apparatus and/or methods. In some embodiments, the magnetic sensors can measure the magnetic field based on the change in resistivity that is proportional to the perpendicular magnetic field. By using magnetic sensors, such as AMR sensors, and various combinations of sensing elements of the magnetic sensor, an error can be detected according to aspects of this disclosure. For instance, embodiments described herein can overcome challenges related to sensor errors due to shorting of resistive sensing elements of AMR sensors, electrostatic discharge (ESD) leakage of output circuit(s), damages to one or more filters (e.g., electromagnetic compatibility (EMC) filter), gain errors, nonlinearity errors, the like, or any combination thereof.

In other embodiments, other types of sensing elements that obtain positional information from a differential Sin and/or Cos output may be used to implement the error detection apparatus and methods described herein. For example, elements such as a resolver, Hall Effect sensing elements, optical sensing elements, the like or any combination thereof may be used. Furthermore, the disclosure herein can provide self-checking of sensing error regardless of sensor variations due to temperature, for example.

Aspects of this disclosure can be implemented in a magnetic angle sensor including, for example, the sensing circuit 102. Such a magnetic sensor can include AMR sensing elements, signal conditioning electronics and an interface. In one application, the interface can be a peripheral acceleration sensor (PAS) interface, such as a PAS4 interface for remote accelerometers used for airbag deployment in vehicles, for communication with a host electronic control unit (ECU). The magnetic angle sensor can be implemented in an automotive Electric Power Assisted Steering (ePAS) system. Such a system has a functional safety specification defined in accordance with ISO-26262, which is a functional safety standard for road vehicles. The principles and advantages discussed herein can be implemented to verify angle and/or radius measurements (e.g., rotation of the shaft 106 associated with a steering wheel) in an ePAS system to satisfy a functional safety specification. In other instances, the illustrated implementation 100 can be used in other systems complying with other specifications or standards, or systems requiring relatively low error in and/or robust cross-checking of angle sensing. In some embodiments, the sensing ranges of magnetic, mechanical, and/or electrical angles can be different from each other. For example, in an embodiment using AMR sensors, such as illustrated in the sensing circuit 102 of FIG. 1A, a 90° rotation in electrical angle may correspond to a 45° rotation in magnetic angle.

As described herein "electrical angle" can be understood as the angle calculated from $\arctan(V_{SIN}/V_{COS})$, and as described above "magnetic angle" can be understood as $ANGLE_{MAG}$ calculated according to Equation 1 above. The "magnetic angle" can be the "electrical angle" divided by 2. Also as described herein "mechanical angle" can be understood as the angle determined based on the magnet design, which can be reflected in a mechanical-to-magnetic angle transfer function. In embodiments using a single pole-pair magnet, the "mechanical angle" and "magnetic angle" are the same. In embodiments using a multi-pole magnet, such a pole-ring, the "mechanical angle" can be expressed as ($ANGLE_{MAG}$/N), where N is the number of pole pairs.

Figure 1B:
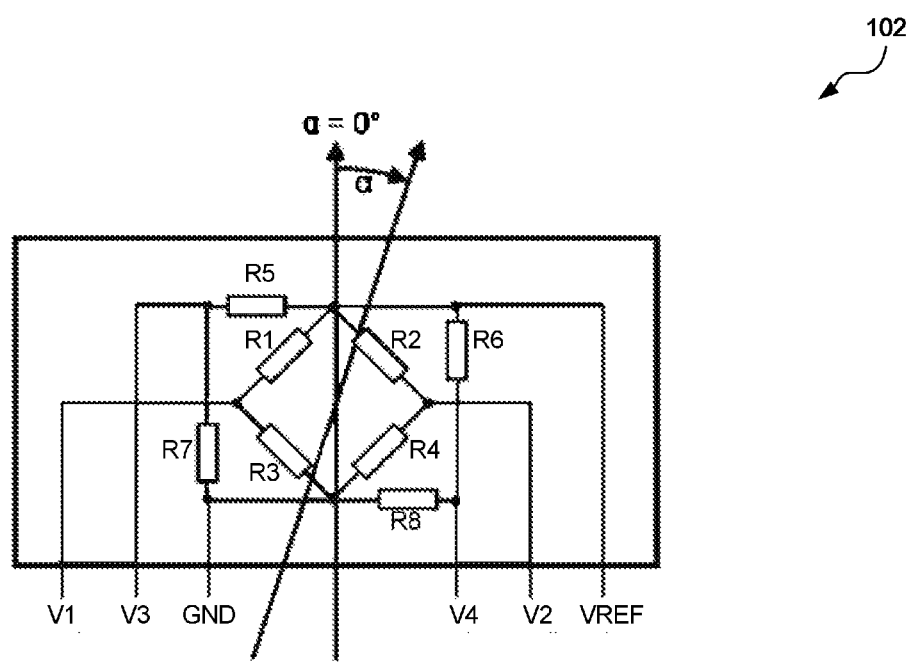
FIG. 1B is a diagram of an example implementation of the sensing circuit 102 of FIG. 1A according to one embodiment.

FIG. 1B shows a diagram of example implementation of the sensing circuit 102 of FIG. 1A according to one embodiment. A sensing circuit may have a plurality of half bridges, and the example sensing circuit 102 illustrated in FIG. 1B includes a system of half bridges having sensing elements of two full bridges (or four half bridges) and four half bridge outputs V1, V2, V3, and V4. A plurality of half bridges (or full bridges which are paired half bridges) of the half bridge system can be oriented at an angle relative to one another and configured to be sensitive to a magnetic field in different directions. In FIG. 1B, the full bridges are oriented at a 45° angle relative to each other. One sensing element being oriented at an angle relative to another sensing element encompasses being oriented at any suitable non-zero angle relative to another sensing element. As further described below, a plurality of combinations of the half bridge outputs may be used to determine the angle of rotation and/or sensor radius and detect sensor errors. In various implementations of half bridge systems, one or more of the combinations of the half bridge outputs may be interdependent, and a plurality of non-interdependent half bridge combinations may be selected. In other embodiments, the system of half bridges may include more or fewer half bridges than the embodiment illustrated in FIG. 1B.

In the example illustrated in FIG. 1B, it is possible to treat each of the full bridge elements as two half bridges. In FIG. 1B, each of the resistors in the bridges have been labeled. In the following description, the full bridge composed of resistors R1-R4 will be called Bridge 1 and the full bridge composed of resistors R5-R8 will be called Bridge 2. Each of the resistors in the bridge responds to magnetic angle as shown below:

$$R_x = R \pm \Delta R \cdot \sin(2\alpha) \qquad \text{Bridge 1:}$$

$$R_x = R \pm \Delta R \cdot \sin(2(\alpha+45)) \qquad \text{Bridge 2:}$$

where α is the magnetic stimulus angle, which, for example, may correlate to the rotation angle 108 of FIG. 1A, and R can represent the nominal resistance value of each resistor in the bridge. The system of half-bridges can be named as indicated in the table below:

TABLE 1

Half bridge naming convention

| Half Bridge Name | Resistors |
|---|---|
| HB1 | R1, R3 |
| HB2 | R2, R4 |
| HB3 | R5, R7 |
| HB4 | R6, R8 |

If the sensor is treated as two full bridges, at least two pieces of useful information are available, namely (V2−V1) and (V4−V3).

If the sensor is treated as a set of half-bridges, we have six pieces of available information, as summarized in Table 2 below.

TABLE 2

Half-bridge combination voltage naming convention

| Combination Voltage Name | Output combination |
|---|---|
| $V_{B1}$ | V2-V1 |
| $V_{B2}$ | V4-V3 |
| $V_{B3}$ | V3-V1 |
| $V_{B4}$ | V4-V2 |
| $V_{B5}$ | V3-V2 |
| $V_{B6}$ | V4-V1 |

The voltages at nodes providing outputs V1 to V4 of the half-bridges can be as shown below:

$$V_1 = V_{REF} \cdot \frac{R3}{R3 + R1} \quad \text{(Equation 5)}$$
$$= V_{REF} \cdot \frac{R - \Delta R \cdot \sin(2\alpha)}{R - \Delta R \cdot \sin(2\alpha) + R + \Delta R \cdot \sin(2\alpha)}$$
$$= V_{REF} \cdot \left[0.5 - \frac{\Delta R}{2R} \cdot \sin(2\alpha)\right]$$

$$V_2 = V_{REF} \cdot \frac{R4}{R4 + R2} \quad \text{(Equation 6)}$$
$$= V_{REF} \cdot \frac{R + \Delta R \cdot \sin(2\alpha)}{R + \Delta R \cdot \sin(2\alpha) + R - \Delta R \cdot \sin(2\alpha)}$$
$$= V_{REF} \cdot \left[0.5 + \frac{\Delta R}{2R} \cdot \sin(2\alpha)\right]$$

$$V_3 = V_{REF} \cdot \frac{R7}{R7 + R5} \quad \text{(Equation 7)}$$
$$= V_{REF} \cdot \frac{R - \Delta R \cdot \sin(2(\alpha + 45))}{R - \Delta R \cdot \sin(2(\alpha + 45)) + R + \Delta R \cdot \sin(2(\alpha + 45))}$$
$$= V_{REF} \cdot \left[0.5 - \frac{\Delta R}{2R} \cdot \sin(2(\alpha + 45))\right]$$

$$V_4 = V_{REF} \cdot \frac{R8}{R8 + R6} \quad \text{(Equation 8)}$$
$$= V_{REF} \cdot \frac{R + \Delta R \cdot \sin(2(\alpha + 45))}{R + \Delta R \cdot \sin(2(\alpha + 45)) + R - \Delta R \cdot \sin(2(\alpha + 45))}$$
$$= V_{REF} \cdot \left[0.5 + \frac{\Delta R}{2R} \cdot \sin(2(\alpha + 45))\right]$$

In Equations 5 to 8, $V_{REF}$ can represent a reference voltage applied to the sensing elements, and R can represent the nominal resistance value of each resistor in the bridge.

In the circuit illustrated in FIG. 1B, $V_{B1}$ and $V_{B2}$ should be the same as when the sensor is treated as two full bridges.

$V_{B1}$ can be computed as shown in Equations 9 and 10:

$$V_{B1} = V_2 - V_1 = 0.5 + \frac{\Delta R}{2R} \cdot \sin(2\alpha) - \left[0.5 - \frac{\Delta R}{2R} \cdot \sin(2\alpha)\right] \quad \text{(Equation 9)}$$

$$V_{B1} = V_{REF} \cdot \frac{\Delta R}{2R} \cdot \sin(2\alpha) \quad \text{(Equation 10)}$$

$V_{B2}$ can be computed as shown in Equations 11 and 12:

$$V_{B2} = V_4 - V_3 = \quad \text{(Equation 11)}$$
$$0.5 + \frac{\Delta R}{2R} \cdot \sin(2(\alpha + 45)) - \left[0.5 - \frac{\Delta R}{2R} \cdot \sin(2(\alpha + 45))\right]$$

$$V_{B2} = V_{REF} \cdot \frac{\Delta R}{2R} \cdot \sin(2(\alpha + 45)) \quad \text{(Equation 12)}$$

The extra information available from the half-bridges can be as shown below, and $V_{B3}$ can be computed as shown in Equations 13 and 14:

$$V_{B3} = V_3 - V_1 = \quad \text{(Equation 13)}$$
$$V_{REF}\left\{0.5 - \frac{\Delta R}{2R} \cdot \sin(2(\alpha + 45)) - \left[0.5 - \frac{\Delta R}{2R} \cdot \sin(2\alpha)\right]\right\}$$

$$V_{B3} = -V_{REF} \cdot \frac{\Delta R}{2R} \cdot [\sin(2(\alpha + 45)) - \sin(2\alpha)] \quad \text{(Equation 14)}$$

To simplify the expression of $V_{B3}$, the following trigonometric identity can be used:

$$\sin z_1 - \sin z_2 = 2\cos\left(\frac{z_1 + z_2}{2}\right)\sin\left(\frac{z_1 - z_2}{2}\right) \quad \text{(Equation 15)}$$

Thus, $V_{B3}$ can be further computed as shown in Equations 16, 17, and 18:

$$V_{B3} = \quad \text{(Equation 16)}$$
$$-\frac{\Delta R}{2R} \cdot V_{REF} \cdot \left[2 \cdot \cos\left(\frac{2(\alpha + 45) + 2\alpha}{2}\right)\sin\left(\frac{2(\alpha + 45) - 2\alpha}{2}\right)\right]$$

$$V_{B3} = -\frac{\Delta R}{2R} \cdot V_{REF} \cdot [\cos(2\alpha + 45)\sin(45)] \quad \text{(Equation 17)}$$

$$V_{B3} = -\frac{\Delta R}{\sqrt{2}\,R} \cdot V_{REF} \cdot [\cos(2\alpha + 45)] \quad \text{(Equation 18)}$$

$V_{B4}$ can be computed as shown in Equations 19 and 20:

$$V_{B4} = V_4 - V_2 = \quad \text{(Equation 19)}$$
$$V_{REF}\left\{0.5 + \frac{\Delta R}{2R} \cdot \sin(2(\alpha + 45)) - \left[0.5 + \frac{\Delta R}{2R} \cdot \sin(2\alpha)\right]\right\}$$

$$V_{B4} = \frac{\Delta R}{2R} \cdot V_{REF} \cdot [\sin(2(\alpha + 45)) - \sin(2\alpha)] \quad \text{(Equation 20)}$$

To simplify the expression of $V_{B4}$, the following trigonometric identity can be used:

$$\sin z_1 - \sin z_2 = 2\cos\left(\frac{z_1+z_2}{2}\right)\sin\left(\frac{z_1-z_2}{2}\right) \quad \text{(Equation 21)}$$

Thus, $V_{B4}$ can be further computed as shown in Equations 22, 23, and 24:

$$V_{B4} = \quad \text{(Equation 22)}$$
$$\frac{\Delta R}{2R} \cdot V_{REF} \cdot \left[2\cdot\cos\left(\frac{2(\alpha+45)+2\alpha}{2}\right)\sin\left(\frac{2(\alpha+45)-2\alpha}{2}\right)\right]$$

$$V_{B4} = \frac{\Delta R}{2R} \cdot V_{REF} \cdot [\cos(2\alpha+45)\sin(45)] \quad \text{(Equation 23)}$$

$$V_{B4} = \frac{\Delta R}{\sqrt{2}\,R} \cdot V_{REF} \cdot [\cos(2\alpha+45)] \quad \text{(Equation 24)}$$

$V_{B5}$ can be computed as shown in Equations 25 and 26:

$$V_{B5} = V_3 - V_2 = \quad \text{(Equation 25)}$$
$$V_{REF}\left\{0.5 - \frac{\Delta R}{2R}\cdot\sin(2(\alpha+45)) - \left[0.5 + \frac{\Delta R}{2R}\cdot\sin(2\alpha)\right]\right\}$$

$$V_{B5} = -\frac{\Delta R}{2R} \cdot V_{REF} \cdot [\sin(2(\alpha+45)) + \sin(2\alpha)] \quad \text{(Equation 26)}$$

To simplify the expression of $V_{B5}$, the following trigonometric identity can be used:

$$\sin z_1 + \sin z_2 = 2\sin\left(\frac{z_1+z_2}{2}\right)\cos\left(\frac{z_1-z_2}{2}\right) \quad \text{(Equation 27)}$$

Thus, $V_{B5}$ can be further computed as shown in Equations 28, 29, and 30:

$$V_{B5} = \quad \text{(Equation 28)}$$
$$-\frac{\Delta R}{2R} \cdot V_{REF} \cdot \left[2\cdot\cos\left(\frac{2(\alpha+45)+2\alpha}{2}\right)\sin\left(\frac{2(\alpha+45)-2\alpha}{2}\right)\right]$$

$$V_{B5} = -\frac{\Delta R}{2R} \cdot V_{REF} \cdot [\cos(2\alpha+45)\sin(45)] \quad \text{(Equation 29)}$$

$$V_{B5} = -\frac{\Delta R}{\sqrt{2}\,R} \cdot V_{REF} \cdot [\cos(2\alpha+45)] \quad \text{(Equation 30)}$$

$V_{B6}$ can be computed as shown in Equations 31 and 32:

$$V_{B6} = V_4 - V_1 = \quad \text{(Equation 31)}$$
$$V_{REF}\left\{0.5 + \frac{\Delta R}{2R}\cdot\sin(2(\alpha+45)) - \left[0.5 - \frac{\Delta R}{2R}\cdot\sin(2\alpha)\right]\right\}$$

$$V_{B6} = \frac{\Delta R}{2R} \cdot V_{REF} \cdot [\sin(2(\alpha+45)) + \sin(2\alpha)] \quad \text{(Equation 32)}$$

To simplify the expression of $V_{B6}$, the following trigonometric identity can be used:

$$\sin z_1 + \sin z_2 = 2\sin\left(\frac{z_1+z_2}{2}\right)\cos\left(\frac{z_1-z_2}{2}\right) \quad \text{(Equation 33)}$$

Thus, $V_{B6}$ can be further computed as shown in Equations 34, 35, and 36:

$$V_{B6} = \quad \text{(Equation 34)}$$
$$\frac{\Delta R}{2R} \cdot V_{REF} \cdot \left[2\cdot\sin\left(\frac{2(\alpha+45)+2\alpha}{2}\right)\cos\left(\frac{2(\alpha+45)-2\alpha}{2}\right)\right]$$

$$V_{B6} = \frac{\Delta R}{R} \cdot V_{REF} \cdot [\sin(2\alpha+45)\cos(45)] \quad \text{(Equation 35)}$$

$$V_{B6} = \frac{\Delta R}{\sqrt{2}\,R} \cdot V_{REF} \cdot [\sin(2\alpha+45)] \quad \text{(Equation 36)}$$

In all of the above calculations, the radius can be computed as follows:

$$\frac{\Delta R}{R} \cdot V_{REF} = \text{radius} \quad \text{(Equation 37)}$$

Still referring to FIG. 1B, there are a number of methods to use the extra pieces of information from the half-bridges. One method is to use the extra information to verify the primary channel data. When using this method, the angle and radius can be calculated from $V_{B1}$ and $V_{B2}$. The expected values for one or more of $V_{B3}$ to $V_{B6}$ could be calculated based on the angle and radius determined from $V_{B1}$ and $V_{B2}$. An auxiliary analog channel, which could include multiple paths, a single multiplexed path, or a single path that receives outputs from half bridges of different full bridges, could then be used to determine $V_{B3}$ to $V_{B6}$, and the outputs of each measurement could be compared to the expected value. It can be observed from the equations for $V_{B3}$ to $V_{B6}$ that these values can be determined from computing two of these values from sensor data and then deriving the other two values from the two values computed from sensor data, as $V_{B4}$ is the additive inverse of $V_{B3}$, and $V_{B6}$ is the additive inverse of $V_{B5}$.

Figure 1C:
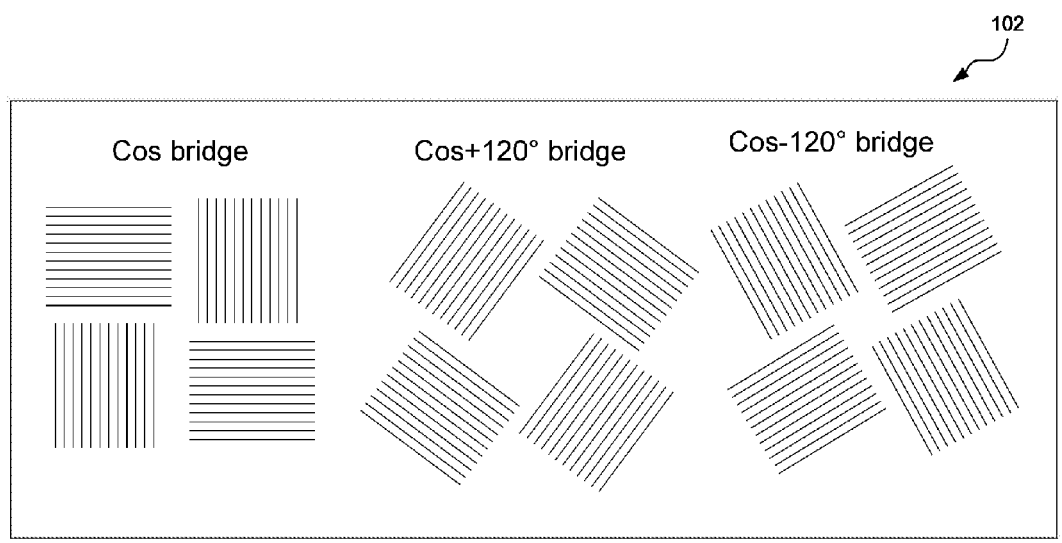
FIG. 1C is a diagram of an example implementation of the sensing circuit 102 of FIG. 1A in part according to another embodiment.

FIG. 1C shows in part a diagram of another example implementation of the sensing circuit 102 of FIG. 1A. A half bridge system having more than five half bridges as its sensing elements may be configured to determine which half bridge is defective or producing an error, for example. In FIG. 1C, the sensing circuit having XMR sensing elements has three full bridges (six half bridges), which are each oriented at an angle to one another. In this example, the three full bridges are oriented at physical angles of 120° to one another. In other embodiments may include different number of sensing elements (i.e., full/half bridges) at different relative orientation angles (e.g., 22.5°, 45°, 90°). In some embodiments, resistor matching with the resistors close together and/or interlaced can be beneficial.

Figure 2A:
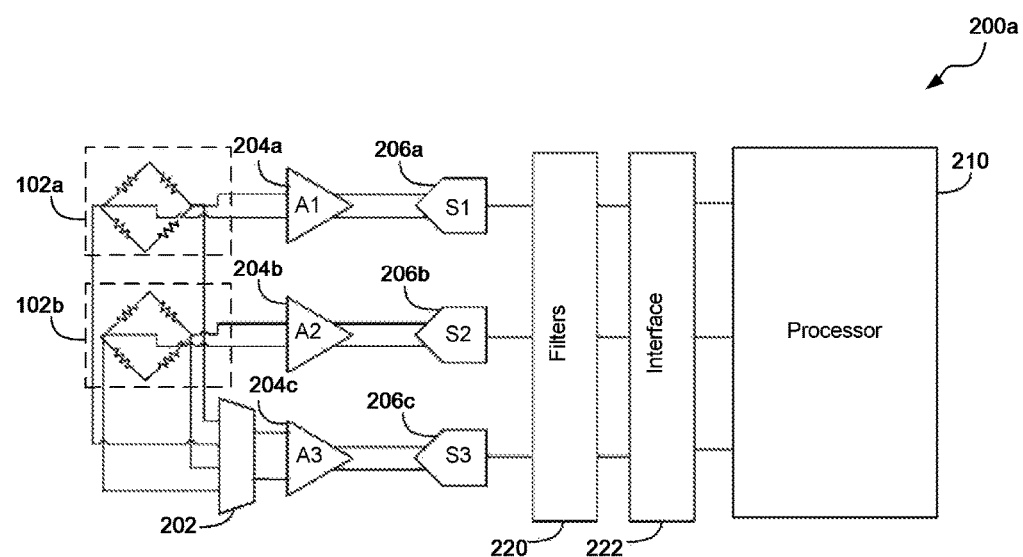
FIG. 2A is a block diagram of an example implementation that includes three channels and a processor according to one embodiment.
Figure 2B:
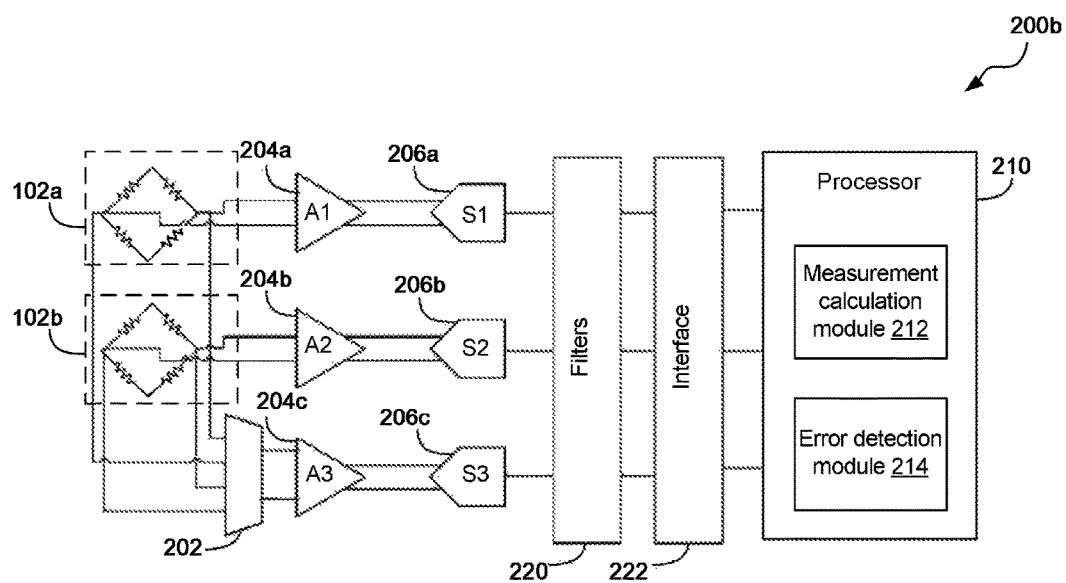
FIG. 2B is a block diagram of another example implementation that includes three channels and a processor according to one embodiment.
Figure 2C:
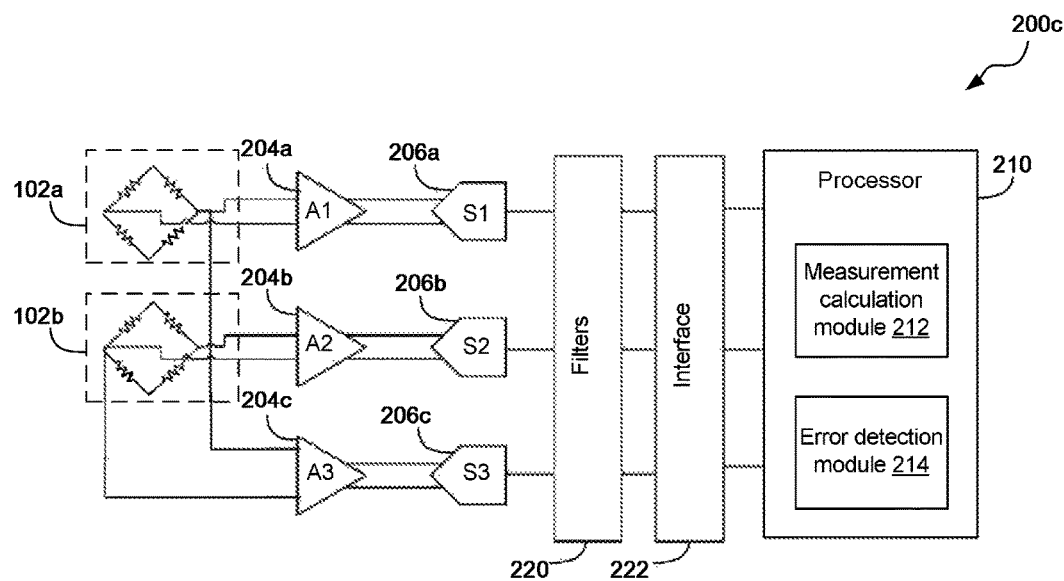
FIG. 2C is a block diagram of another example implementation that includes three channels and a processor according to one embodiment.

FIG. 2A is a block diagram of an example implementation according to one embodiment. The illustrated circuit 200a includes sensing elements 102a and 102b, which can be part of the sensing circuit 102 described above in connection with FIGS. 1A-1C, a multiplexer 202, and a processor 210 performing various functions described herein. The illustrated circuit 200a further includes differential amplifiers 204a, 204b, and 204c, sampling circuits 206a, 206b, and 206c, filters 220, and an interface 222. A channel can include an amplifier, a sampling circuit and/or any other circuitry to process signals from the sensing circuit 102 in a signal path to the processor 210. In some embodiments, a first channel can include the sensing element 102a, the amplifier 204a, the sampling circuit 206a, at least part of the filters 220, and at least part of the interface 222. A second channel can include the sensing element 102b, the amplifier 204b, the sampling circuit 206b, at least part of the filters 220, and at least part of the interface 222. A third channel can include the multiplexer 202, the amplifier 204c, the sampling circuit 206c, at least part of the filters 220, and at least part of the interface 222 as shown in FIG. 2A. The third channel can alternatively be implemented without the multiplexer 202 as shown in FIG. 2C. Although not illustrated in FIGS. 2A-2C, signals from the sensing elements 102a and 102b as described herein can be signals directly from the sensing elements 102a and 102b or by way of one or more intervening circuit elements following the sensing elements 102a and 102b, such as the one or more pre-processing or intervening circuits illustrated in FIG. 2E and described below.

The sampling circuits 206a, 206b, and 206c can each include, for example, an analog-to-digital converter (ADC), such as a sigma-delta ADC. It should be noted that FIGS. 2A-2C do not illustrate physical orientation of the sensing elements 102a and 102b as the sensing elements (e.g., 102a and 102b; three or more sensing elements in other embodiments) are oriented at an angle with respect to one another, for example, as described in connection with FIGS. 1B-1C above. The multiplexer 202 receives four half bridge outputs from the sensing elements 102a, 102b (i.e., first and second full bridges). The multiplexer 202 may select one combination of the half bridge outputs that is different from the combination sent to the amplifier 204a and also different from the combination sent to the amplifier 204b. The multiplexer 202 can receive at least three of the four half bridge outputs and select a combination of those outputs that is different from the combination sent to the amplifier 204a and also different from the combination sent to the amplifier 204b in another embodiment. According to yet another embodiment, one of the differential inputs of amplifier 204c can receive a half bridge output and the other differential input of the amplifier 204c can be electrically connected to a multiplexer arranged to select one of two or more half bridge outputs to provide to the other differential input of the amplifier 204c. The multiplexer 202 can be optional as FIG. 2C described below illustrates an embodiment without the multiplexer 202. FIGS. 2A-2C may further include analog circuit elements to reduce computation by the processor 210, for example, as further illustrated in FIG. 2E below.

FIG. 2B is a block diagram of another example implementation according to one embodiment. The circuit 200b of FIG. 2B can implement any of the principles and advantages of the circuit 200a of FIG. 2A. As illustrated in FIG. 2B, the processor 210 includes a measurement calculation module 212 and an error detection module 214 to perform the various functions described herein. Each of these modules can be implemented with physical hardware. The measurement calculation module 212 can compute angle and radius, for example, in accordance with Equations 1 and 2 above. The measurement error detection module 214 can compare a value associated with data from the third channel that includes the amplifier 204c and the sampling circuit 206c with data associated with the first and second channels that include the amplifier 204a and the sampling circuit 206a and the amplifier 204b and the sampling circuit 206b, respectively, to detect whether there is a sensor error. The error detection module 214 can also perform any suitable computations to support the comparison. For instance, the error detection module 214 can compute an expected value of the third channel data from one of the combinations of expected half bridge values (e.g., $V_{B3}$ to $V_{B6}$) different from the ones used to calculate the angle and radius. The expected third channel data based, for example, on two of $V_{B3}$ to $V_{B6}$, can be computed in accordance with Equations 18, 24, 30, 36, and/or 37 using the angle and radius values determined by the measurement calculation module 212. The third channel data can be data received from the third channel or a value computed based on data received from the third channel. The processor 210 in any of the illustrated embodiments can be implemented by a host electronic control unit (ECU) of an Electric Power Assisted Steering (ePAS) system, for example.

FIG. 2C is a block diagram of another example implementation according to one embodiment. The illustrated circuit 200c is implemented without the multiplexer 202 (FIGS. 2A-2B). The differential amplifier 204c in FIG. 2C receives its first input from the sensing element 102a (i.e., the first full bridge) and its second input from the sensing element 102b (i.e., the second full bridge). In other embodiments, the differential amplifier 204c may receive its first input from the sensing element 102b (i.e., second full bridge) and its second input from the sensing element 102a (i.e., first full bridge). In this embodiment, the angle and radius can be calculated from the outputs of the amplifiers 204a and 204b, and based on the angle and radius values, the expected data associated with the amplifier 204c can be determined, which is compared with the actual data associated with the amplifier 204c. As this embodiment does not include a multiplexer, it may advantageously conserve power, for example.

Figure 2D:
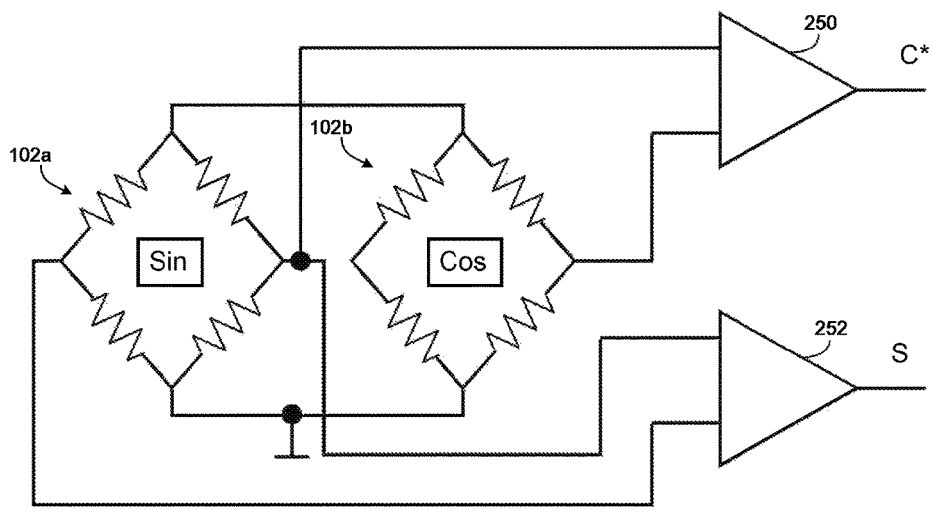
FIG. 2D is a diagram of an example sensing circuit configuration according to one embodiment.
Figure 2E:
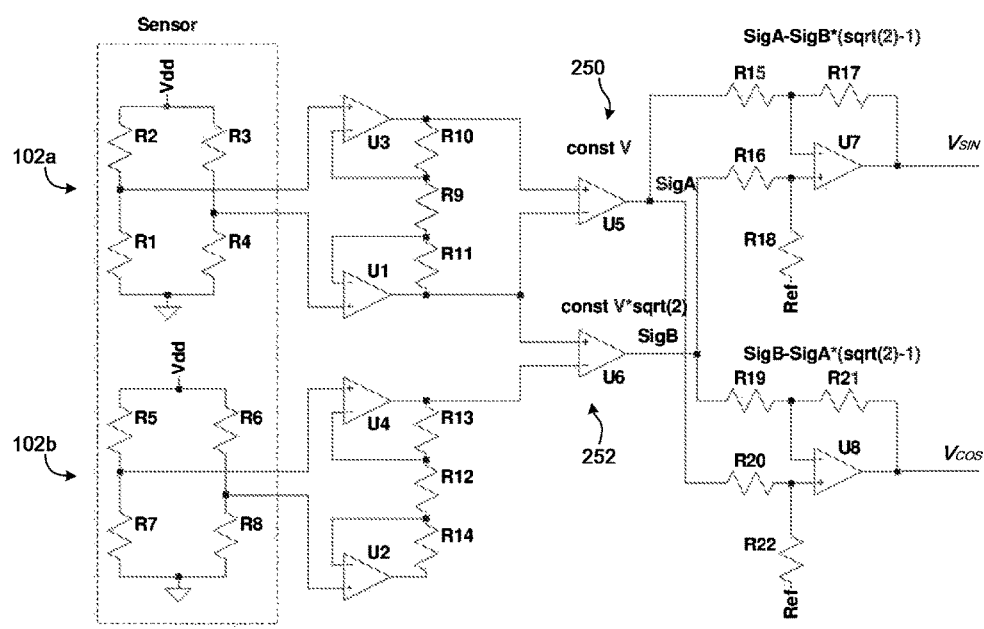
FIG. 2E is a diagram of another example sensing circuit configuration according to one embodiment.

FIG. 2D is a block diagram illustrating double bridge calculation. Angle can be determined as angle=arctan 2(S–C'·($\sqrt{2}$–1), C'–S·($\sqrt{2}$–1)) where C'=C*·$\sqrt{2}$. Two full bridges 102a, 102b of FIG. 2D each includes two half bridges. S is a signal provided by a differential amplifier 252 configured to receive two half bridge outputs and C* is a signal provided by another differential amplifier 250 configured to receive a two half bridge outputs, of which at least one is different than the half bridge outputs received by the other amplifier. The angle determined from the circuit shown in FIG. 2D can be compared to an angle computed from a different combination of the half bridge outputs. For instance, the other combination of half bridge outputs can correspond to the signals provided to amplifiers 204a and 204b of FIGS. 2A-2C. When the difference between the two computed angles satisfies a threshold, an error flag can be set to indicate a sensor error. As shown in FIGS. 2D and 2E, in some embodiments, the determination of the full bridge values (e.g., $V_{SIN}$ and $V_{COS}$) of the first and the second channels, and in turn, the determination the angle and radius values can be implemented with one or more intermediate analog circuits. For example, the differential amplifiers 250 and 252 in FIG. 2D may output intermediate values S and C*, which then can be received by following circuit elements, such as the ones shown in FIG. 2E, to output Sin ($V_{SIN}$) and Cos ($V_{COS}$) signals.

In another embodiment, the angle and radius computed using the differential amplifiers 250 and 252 shown in FIG. 2D can be used to compute an expected value associated with a third sensing channel that receives a different combination of two half bridge outputs from the sensing elements 102a and 102b. The expected value can be one of the values associated with a processed version of one of the voltages of Table 2, for example. The expected value can then be compared to a value generated by the third sensing channel.

FIG. 2E shows a circuit configured to process half bridge outputs. This circuit can be implemented in connection with any of the principles and advantages associated with half bridges discussed herein for purposes of computing angle and/or radius. FIG. 2E illustrates an analog circuit for correcting the phase shift that can reduce time consuming calculation. In some embodiments, at least some of the computations that can be performed by the processor 210 can be performed by the analog circuit illustrated in FIG. 2E to output Sin ($V_{SIN}$) and Cos ($V_{COS}$) signals. It can be advantageous to implement at least some of the computations to be performed by an analog circuit similar to the one disclosed in FIG. 2E, which can, for example, save computation time.

Figure 3A:
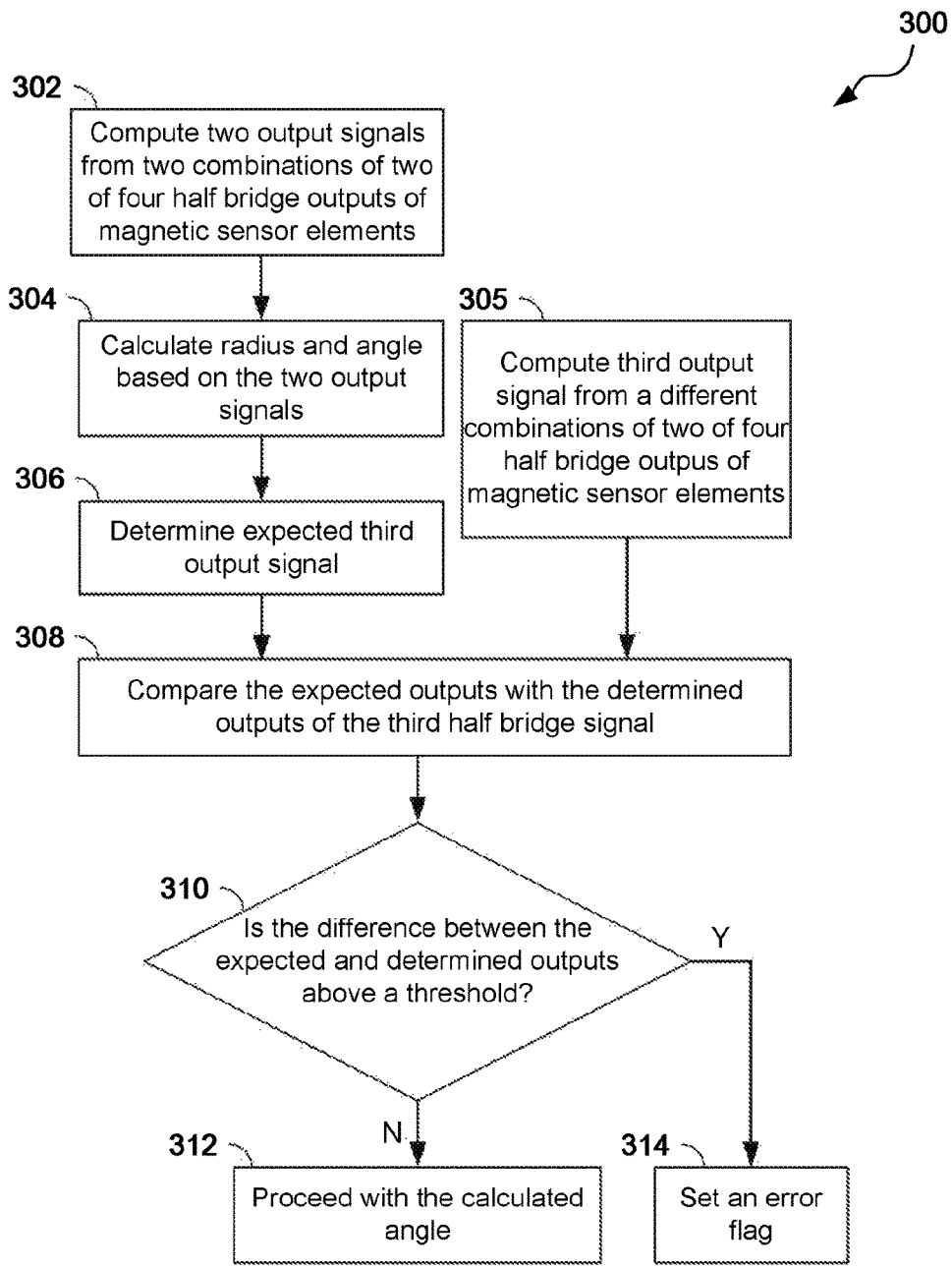
FIG. 3A is a flowchart of an example implementation of the error detection method described herein according to one embodiment.

FIG. 3A shows an example flowchart implementing an error detection method described herein according to one embodiment. The method can be performed with the circuit elements and one or more modules of the processor illustrated in FIGS. 2A-2C and/or in connection with the circuits illustrated in FIGS. 2D-2E.

In operation 302, two output signals from two combinations of two of four half-bridge outputs of magnetic sensor elements are computed. For example, the two output signals computed in operation 302 may correspond to the outputs from the first and the second channels. In operation 304, angle and radius can be determined based on the two output signals from the operation 302. In operation 306, the expected third output signal can be determined based on the angle and radius determined in operation 304. In operation 305, the third output signal or data associated with the third channel can be determined or obtained. In operation 308, the expected outputs and the determined or obtained output of the third channel can be compared to, for example, compute the difference between the expected and determined values. In operation 310, it can be determined whether the difference between the expected and determined outputs of the third channel is greater than a threshold. If the difference is greater than the threshold, an error can be indicated in operation 314. If the difference is not greater than the threshold, the process 300 can proceed to operation 312 to use the calculated angle.

In some embodiments, operations in FIG. 3A can be performed by the various elements of the circuits shown in FIGS. 2A-2E. For example, operation 304 can be performed by the measurement calculation module 212 in FIGS. 2B and 2C, and operations 306, 308, and 310 can be performed, for example, by the error detection module 214 in FIGS. 2B and 2C.

Figure 3B:
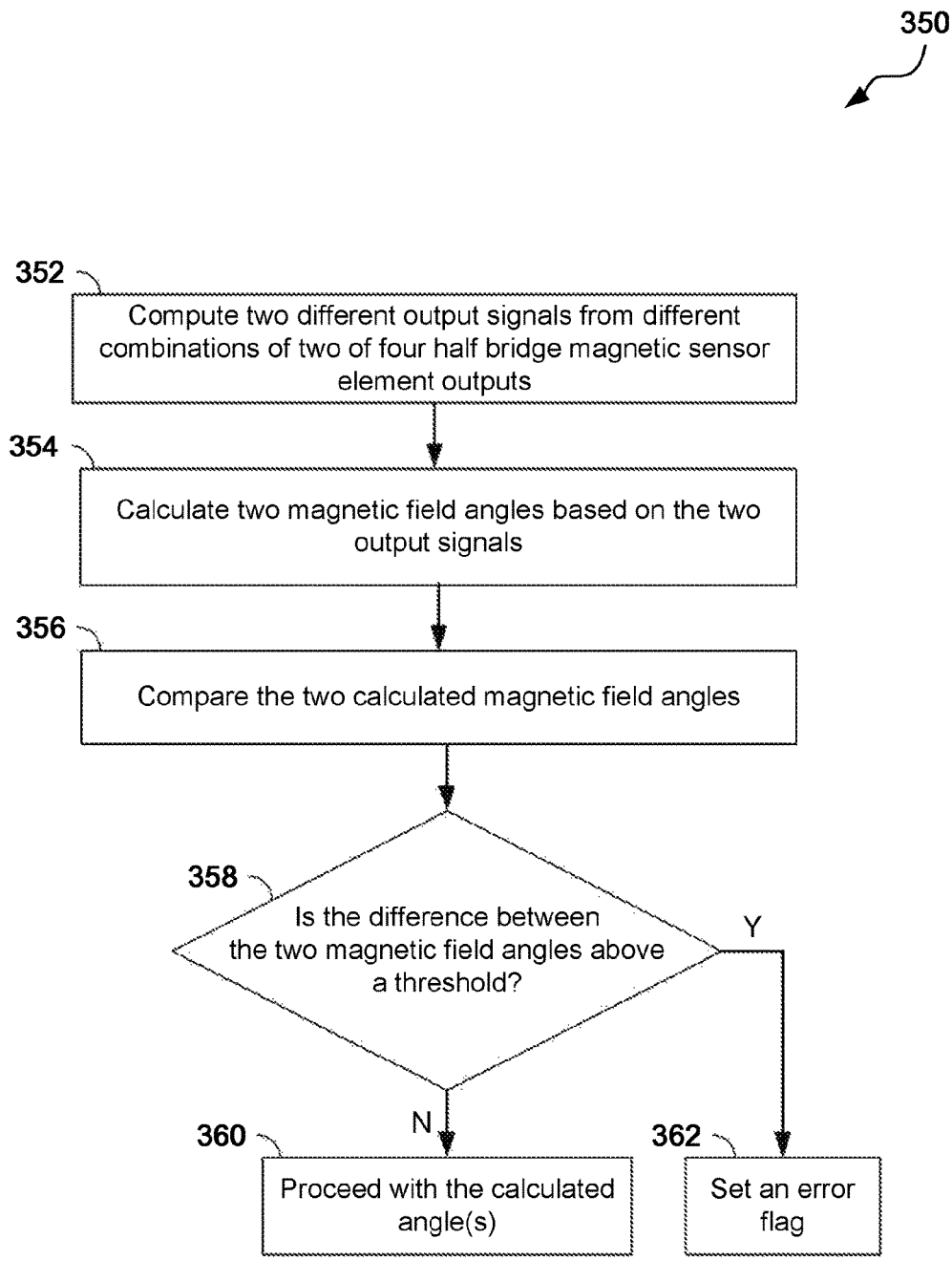
FIG. 3B is a flowchart of an example implementation of the error detection method described herein according to another embodiment.

FIG. 3B shows another example flowchart implementing the error detection method described herein according to one embodiment. The method can be performed with the analog circuit elements and one or more modules of the processor illustrated in FIGS. 2A-2C and/or in connection with the circuits illustrated in FIGS. 2D-2E.

In operation 352, two different output signals from different combinations of two of four half-bridge magnetic sensor element outputs can be determined. In operation 354, two magnetic field angles can be determined separately based on the two output signals from operation 352. In operation 356, the two separately determined magnetic field angles can be compared to, for example, compute the difference between the two magnetic field angles. In operation 358, it can be determined whether the difference between the two magnetic field angles is above a threshold. If the difference is greater than the threshold, an error can be indicated in operation 362. If the difference is not greater than the threshold, the process 350 can proceed to operation 360 to use the one of the calculated angles.

In some embodiments, operations in FIG. 3B can be performed by the various elements of the circuits shown in FIGS. 2A-2E. For example, operations 352 and 354 can be performed by the measurement calculation module 212 in FIGS. 2B and 2C, and operations 356 and 358 can be performed, for example, by the error detection module 214 in FIGS. 2B and 2C.

Aspects of this disclosure can be implemented in various electronic devices. Examples of the electronic devices can include, but are not limited to, consumer electronic products, parts of the consumer electronic products, electronic test equipment, vehicular electronics systems, etc. Examples of the electronic devices can include, but are not limited to, computing devices, communications devices, electronic household appliances, automotive electronics systems, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description of Certain Embodiments using the singular or plural number may also include the plural or singular number respectively. Where the context permits, the word "or" in reference to a list of two or more items is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An apparatus for detecting sensor error, the apparatus comprising:
    a first channel comprising a first magnetic sensing element, the first channel configured to provide first channel data;
    a second channel comprising a second magnetic sensing element, the second magnetic sensing element being oriented at a non-zero angle relative to the first magnetic sensing element, and the second channel configured to provide second channel data;
    a third channel configured to receive a first signal from the first magnetic sensing element and a second signal from the second magnetic sensing element, the third channel configured to provide third channel data; and
    a processor configured to:
        receive first channel data from the first channel, second channel data from the second channel, and the third channel data;
        compute expected third channel data from the first channel data and the second channel data, wherein the first channel data is associated with the first magnetic sensing element, and wherein the second channel data is associated with the second magnetic sensing element that is oriented at the non-zero angle relative to the first magnetic sensing element; and
        detect sensor error based at least partly on a comparison of the expected third channel data with the third channel data.

2. The apparatus of claim 1, wherein the processor is further configured to:
    determine an angle and a radius based at least partly on the first channel data and the second channel data; and
    compute the expected third channel data based at least partly on the angle and the radius.

3. The apparatus of claim 1, wherein each of the first and second magnetic sensing elements comprises a magnetoresistance sensor.

4. The apparatus of claim 1, wherein the non-zero angle is approximately 45 degrees.

5. The apparatus of claim 1, wherein each of the first, second, and third channels further comprises an amplifier and a sampling circuit.

6. The apparatus of claim 1, wherein the first magnetic sensing element comprises a first full bridge and the second magnetic sensing element comprises a second full bridge, and wherein the first signal is an output from a half-bridge of the first full bridge and the second signal is an output from a half-bridge of the second full bridge.

7. The apparatus of claim 1, wherein the first magnetic sensing element comprises a first full bridge and the second magnetic sensing element comprises a second full bridge, and wherein the first sensing channel is configured to process two half bridge outputs of the first full bridge and the second sensing channel is configured to process two half bridge outputs of the second full bridge.

8. The apparatus of claim 1, wherein the first and second magnetic sensing elements are collocated.

9. The apparatus of claim 1, wherein the apparatus is configured to provide an error flag responsive to the detected error satisfying a threshold.

10. An electronic power assisted steering system comprising the apparatus of claim 1.

11. A method for detecting sensor error associated with magnetic sensing elements, the method comprising:
    receiving first sensor data from a first channel and second sensor data from a second channel, wherein the first channel is configured to process at least a first signal from a first magnetic sensing element of the magnetic sensing elements, and the second channel is configured to process at least a second signal from a second magnetic sensing element of the magnetic sensing elements, the second magnetic sensing element being oriented at an angle relative to the first magnetic sensing element;
    determining an angle based at least partly on the first sensor data and the second sensor data, wherein the first sensor data is associated with at least the first signal from the first magnetic sensing element, and wherein the second sensor data is associated with at least the second signal from the second magnetic sensing element;

computing expected third sensor data based at least partly on the angle; and setting an error flag in response to detecting sensor error based at least partly on a comparison of the expected third sensor data with third sensor data from a third channel, wherein the third channel is configured to process the first signal from the first magnetic sensing element and the second signal from the second magnetic sensing element.

12. The method of claim 11, wherein determining the angle comprises computing the angle using an arctan function.

13. The method of claim 11, wherein each of the first and second magnetic sensing elements comprises an anisotropic magnetoresistance (AMR) sensor.

14. The method of claim 11, wherein the angle is approximately 45 degrees.

15. The method of claim 11, further comprising determining a radius based at least partly on the first sensor data and the second sensor data, wherein the computing the expected third sensor data is also based on the radius.

16. An apparatus for detecting sensor error, the apparatus comprising:

magnetoresistive sensing elements comprising four half bridges, the four half bridges comprising a first group of two half bridges and a second group of two half bridges, wherein the first group of two half bridges is oriented at an angle relative to the second group of two half bridges;

sensing channels comprising analog circuitry, the sensing channels being configured to process output signals from the four half bridges, and the sensing channels comprising a first output and a second output, wherein the first output is associated with a first combination of two of the output signals from the four half bridges, wherein the second output is associated with a second combination of two of the output signals of the four half bridges, and wherein the first combination and the second combination are different; and a processor in communication with the sensing channels, the processor configured to:

determine a first magnetic field angle based on the first output of the sensing channels, wherein the first output of the sensing channels is associated with the first combination of two of the output signals of the four half bridges;

determine a second magnetic field angle based on the second output of the sensing channels, wherein the second output of the sensing channels is associated with the second combination of two of the output signals of the four half bridges; and set an error flag in response to detecting that a difference between the first magnetic angle and the second magnetic angle satisfies a threshold.

17. The apparatus of claim 16, wherein the sensing channels comprise differential amplifiers, wherein each of the differential amplifiers is configured to receive a signal from the first group of two half bridges and a signal from the second group of half bridges such that each of the differential amplifiers is configured to receive a different combination of signals from the first and second groups of two half bridges.

18. The apparatus of claim 16, wherein the magnetic sensing elements comprise anisotropic magnetoresistance elements.

19. The apparatus of claim 16, wherein each of the sensing channels comprises an amplifier and a sampling circuit.

20. The apparatus of claim 16, wherein the sensing channels comprise a third output associated with a third combination of two of the output signals from the four half bridges, wherein the third combination is different from both the first combination and the second combination, and wherein the processor is configured to determine the first magnetic angle based on the third output.

* * * * *